Aug. 6, 1968   W. R. EDDY   3,395,525
METHOD AND APPARATUS FOR FRICTIONALLY FIBRILLATING FILMS
Filed Jan. 13, 1967   2 Sheets-Sheet 1

INVENTOR.
W. R. EDDY
BY
Young + Zugg
ATTORNEYS

United States Patent Office 3,395,525
Patented Aug. 6, 1968

3,395,525
METHOD AND APPARATUS FOR FRICTIONALLY FIBRILLATING FILMS
William R. Eddy, Kansas City, Kans., assignor to Phillips Petroleum Company, a corporation of Delaware
Filed Jan. 13, 1967, Ser. No. 609,207
12 Claims. (Cl. 57—34)

ABSTRACT OF THE DISCLOSURE

Method for fibrillating sheet material such as oriented thermoplastic or polyolefin by passing same in frictional engagement across edge of rotating fibrillating means. In one embodiment, several counter rotating fibrillating means are provided having between them means for guiding a web being fibrillated.

---

This invention relates to a method for frictionally fibrillating films. It is also related to an apparatus for frictionally fibrillating films. In one of its aspects, the invention relates to the passing of a film or film-like material into frictional engagement with a fibrillating means. In another of its aspects, the invention relates to an apparatus for passing a film or film-like material into frictional engagement with a fibrillating means.

A concept of the invention is a method for fibrillating a sheet material such as an oriented plastic sheet material which comprises collapsing or compacting said sheet into a mass or web and passing the mass or web thus obtained into contact with the peripheral edge of a rotating fibrillating means. In another concept, the invention is a method for guiding said web into frictional engagement with at least one, but preferably more than one, fibrillating means, and when more than one fibrillating means is employed, the fibrillating means can be rotating in opposite directions. In a further concept, the invention provides guiding means for moving the web at an angle to its direction of travel while it is passing across said rotating fibrillating means. A further concept of the invention is a method in which the web, after having been passed over at least one, but preferably more than one, fibrillating means, is repassed in a reverse direction over said fibrillating means. In another concept, the invention is an apparatus comprising in combination a sheet material feed supply, a means for gathering the sheet continuously from said supply into a compacted mass or web, rotating fibrillating means for frictionally engaging said mass or web, guiding means for guiding said mass or web into, and retaining the same, in frictional engagement with said rotating fibrillating means, and means to recover a now fibrillated and twisted material. In another concept, the invention is an apparatus in which means for guiding the web into frictional engagement with the rotating fibrillating means is adapted to move said web at an angle to its direction of travel while it is in contact with said rotating fibrillating means. In a still further concept, the invention is an apparatus comprising in combination a plurality of fibrillating means, at least two of which rotate in one direction comprise located between them a third fibrillating means rotating in another direction. A still further concept of the invention is an apparatus as described in which there is provided a web-direction-of-travel reversal means to the far side of a fibrillating means, the recovery means and said supply means being located at the same side of said fibrillating means.

It has been known to split sheet-like materials into fibers or threads fit to be spun. Thus, it is known that such fibers or threads possessing excellent mechanical properties can be obtained from organo thermoplastic materials, for example, from olefin polymers, vinyl polymers, etc., by first producing a sheet of a desired degree of fineness or thinness, stretch drawing the sheet to cause molecular orientation thereof, and then subjecting the sheet which has at least a component of orientation in the general direction of the length of the sheet to a mechanical force to fibrillate and/or to twist the same. Patent 2,185,789, issued Jan. 2, 1940, Heinrich Jacqué, discloses a process for producing threads and fibers from polymerized organic materials by forming a thin film of the material, stretching it in the direction of its length substantially producing an orientation of the molecules in the direction of length and to render the film capable of disintegration by friction into fibers, and frictionally working the film to disintegrate it into fibers. In the patent, the foil is cut into strips, and one or more of the strips are drawn between rubber plates which slide backwards and forwards perpendicularly to the direction of the strips, etc.

I have now conceived a method and also an apparatus to directly fibrillate and twist into a mass of fibrillated and twisted material a sheet formed material such as a thermoplastic, e.g., a polyolefin such as polyethylene, copolymers of these polyolefins with other materials or olefins, vinyl polymers and copolymers thereof with other materials, etc., in which the sheet material is taken from a source of supply and without cutting or slitting is compacted or condensed into a mass or web which is then passed into frictional engagement with a rotating fibrillating means. In one embodiment, at one or more of the fibrillating means which can be employed, the web is moved in a direction at an angle to that of its travel. In the preferred embodiment of the invention, several rotating fibrillating means are employed and can be rotated at the same or different revolutions per minute, and preferably successive fibrillating means are rotated in opposite directions either at said same or different speeds. Similarly, when moving the web at an angle with respect to its direction of travel, the motion can be different at one fibrillating means from that which it is at another. Further, the web can be placed under some or no real tension as it is being passed through the operation.

An object of this invention is to provide a method for frictionally fibrillating a fibrillatable film. Another object of this invention is to provide an apparatus for fibrillating a fibrillatable film. A further object of the invention is to provide a method wherein a fibrillatable film of material in sheet form can be directly taken as from a roll and fibrillated and twisted to form a mass of fibrous material or roving. A still further object of the invention is to provide an apparatus which will continuously unroll a sheet of fibrillatable material and convert the same into a mass of fibrous material which can be twisted and which can be further employed by spinning or otherwise to form yarns or threads or otherwise utilized. In a further object still, the invention provides a compacted apparatus with which reverse twisting can be practiced and in which the number of twists is multiplied beyond the number of twisting elements available.

Other concepts, objects and the several advantages of the invention are apparent to one skilled in the art from a study of the disclosure, drawing, and the claims to the invention.

According to the present invention, there is provided a method for producing from a sheet of fibrillatable material, for example a film of oriented polyolefin or polyvinyl material, a mass of twisted fibers which comprises compacting said sheet to form a mass or web of material and passing said web into frictional engagement with at least one rotating fibrillating means. Further according to the invention, there is provided an apparatus comprising in combination a sheet material supply means, a rotating fibrillating means, a means for collapsing or compacting said sheet to form a mass or web, and means for drawing said sheet through said means for compacting and into frictional engagement with said rotating fibrillating means.

In the drawing,

FIGURE 2 is an elevational cross sectional view taken at line A—A of FIGURE 1 at wheel 12 of FIGURE 1 while

Figure 1:
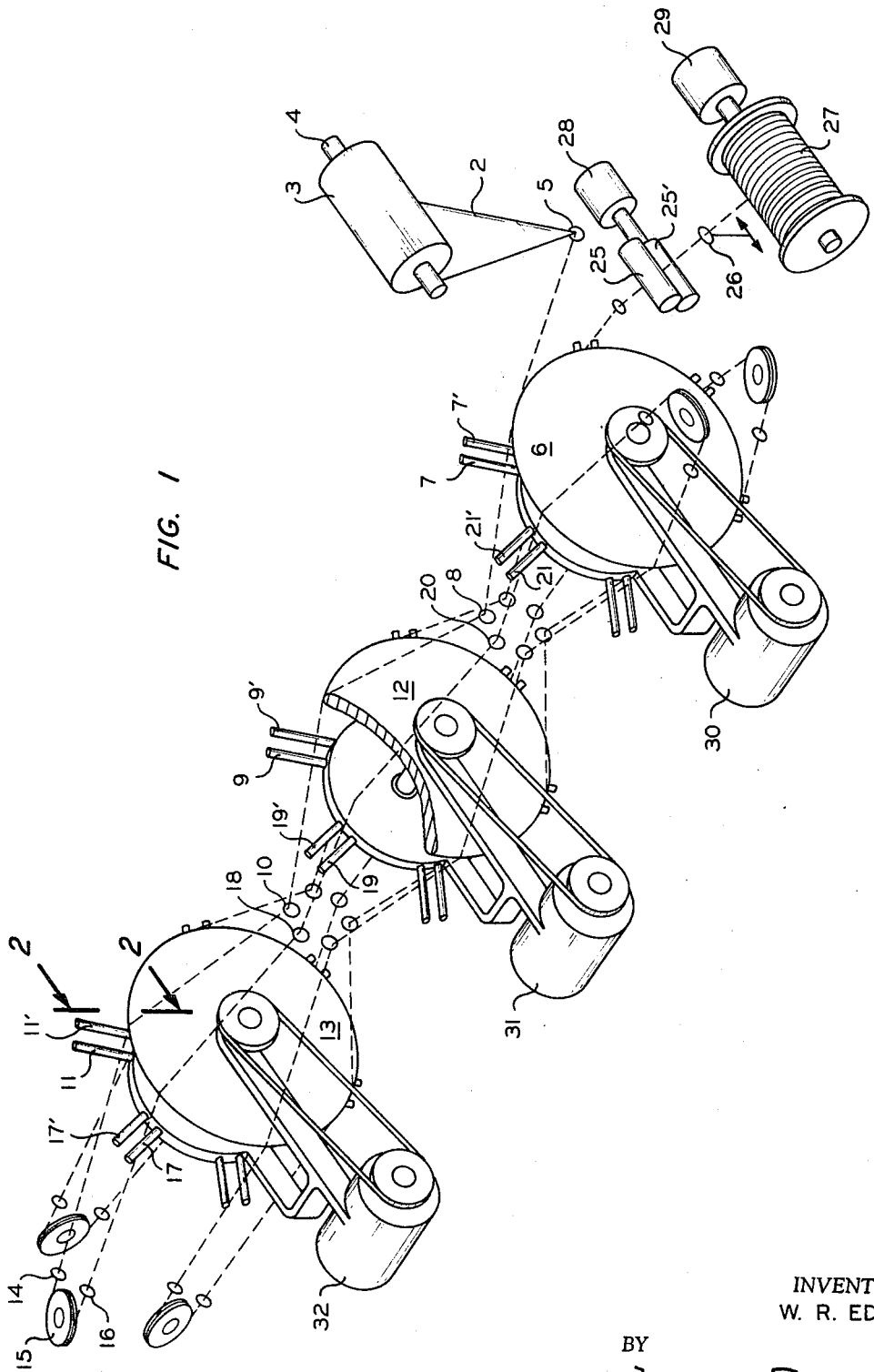
FIGURE 1 shows a preferred embodiment of the apparatus wherewith to carry out the method of the invention in which a plurality of rotating fibrillating elements are employed, several web-direction-of-travel reversing means are employed, and where when each fibrillating means is driven by itself on variable speed drive.

Referring to FIGURE 1, a sheet of a polyolefin such as Marlex prepared according to a method described and claimed in Patent 2,825,721, issued Mar. 4, 1958, J. P. Hogan and R. L. Banks, is pulled from roll 3, mounted on shaft 4, through condensing ring 5, and over filbrillating element or wheel 6 rotating counter clockwise and thence through spacing bars 7 and 7′, and in similar fashion through guide ring 8, spacing bars 9 and 9′, guide ring 10, spacing bars 11 and 11′, across rotating wheels 12 and 13, the latter also rotating counter clockwise, the former rotating clockwise, thence through ring 14, and around reversing pulley 15, the plastic mass traveling now in reverse through elements like those already described, 16, 17, 17′, 18, 19, 19′, 20, 21, 21′ to guide 22 at second reversing pulley 23. In similar manner, the web which is being fibrillated and twisted according to the invention in the apparatus of the invention being described will pass several more times through the apparatus being reversed two more times at the right hand end and one more time at the left hand end until it reaches puller 25, 25′, passes through guide 26 and is received or collected as a fibrous mass on roll 27. The puller rolls and the collector roll can be driven at varying revolutions per minute by motors 28 and 29, respectively. The fibrillating wheels are respectively equipped with motors 30, 31 and 32 which, as noted, are variable speed motors and as desired can be reversible so that during the operation it is possible to change the direction of rotation of any one or more of the fibrillating elements or wheels.

Figure 2:
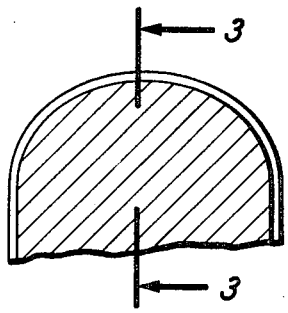
Figure 3:
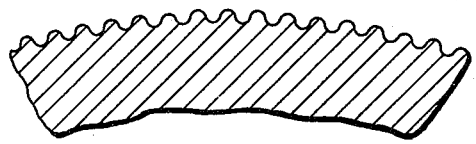
FIGURE 3 is an elevational cross sectional view taken along the line B—B of FIGURE 2.

Referring now to FIGURES 2 and 3, it will be seen that the presently depicted fibrillating wheels or elements possess a sinusoidal periphery against which the web is passed with which it is fibrillated and twisted. Depending upon the nature of the individual elements of the periphery, the web is subject to a substantially constant fibrillation and twisting action. By altering alternate individual elements on the wheel, or some of them, with respect to shape and size and spacing, it is possible to impart to the web varying effects at one or more of the wheels.

Figure 4:
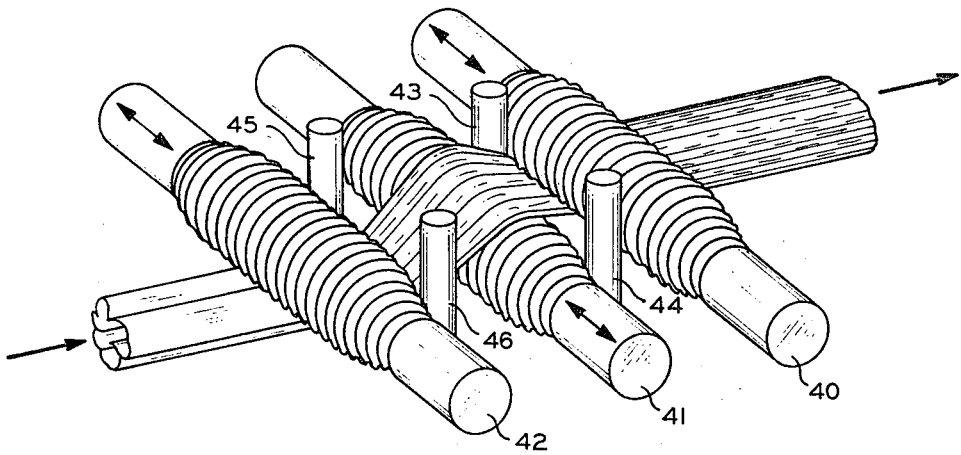
FIGURE 4 shows a modification in which the rotating fibrillating means can additionally be moved axially with respect to guide rolls or slides which may also move or which alone may be moved to move the web at an angle to its direction of travel while it is frictionally engaged with the fibrillating means.

Referring now to FIGURE 4, there are shown three rotating fibrillating elements 40, 41 and 42 driven by motors which can be variable speed motors which are not shown for sake of simplicity, the arrows indicate that the fibrillating elements can be reciprocally moved as well as rotated and this can be at the same or different revolutions per minute and in the same or different directions. Guide rolls or slides 43, 44, 45 and 46 are provided to keep the web on the fibrillating elements which in this embodiment have a larger diameter at their midpoint than at their ends.

It is within the scope of the invention to combine at least one fibrillating element of FIGURE 1 with at least one fibrillating element of FIGURE 4, and to operate each according to the apparatus from which it is taken. FIGURE 4 shows rolls or wheels or elements which are relatively small in diameter with respect to those of FIGURE 1. However, it is possible to have the reverse situation or even to have the wheels of FIGURE 1 approximately the same diameter as the rolls of FIGURE 4. The ridges or special configurations of each of the elements of FIGURE 4 in this embodiment are shown to be the same for each roll, but they can be different. To provide for a progressive fibrillation and twisting, or to obtain varying effects as may be desired, the ridges may be circular or they may be helical or continuous in character, depending upon the effect desired to be obtained. It is possible to have one or more of the fibrillating elements designed with discontinuous ridges, that is to say, ridges presenting a sawtooth or at least discontinuous type of pattern, to impart a periodic pulling action to the web.

The detailed features which have been just described in connection with the figures of the drawing are considered especially to be important features of the invention, since these lead within the broad concept to specific inventive concepts permitting to attain special effects within the ultimate mass of fibrillated and twisted material which is collected at the recovery roll.

The fibrillating elements of FIGURE 4 cannot only be rotated at different speeds, but it is within the scope of the invention to stop one or more of said elements. Further, depending upon the effect being obtained, the flexibility attainable with the combinations of FIGURES 1 and 4 is advantageous. Thus, in the apparatus of the figures, it is possible to change one or more of the positions of the guide rings, such as rings 5, 8 and 10 in FIGURE 1 and guide rolls 43 and 45 in FIGURE 4. This changes the angularity of approach and departure of the web to and from the rotating element. Likewise in FIGURE 4, it is possible to vary the length of stroke in adjusting the position of the rotating elements with respect to the guide rolls or slides and vice versa, if the guide rolls or slides are moving and the shafts of the rotating fibrillating elements are being held substantially stationary. By carefully adjusting during operation the relative positions or lengths of travel of any moving elements, different effects of fibrillation and of twisting can be obtained as one skilled in the art in possession of this disclosure, having studied the same, will understand. Further respecting the FIGURE 4 fibrillating elements, these can have a larger diameter at one point along the axis thereof than at another such point. Still further, the curvature at any point along the axis may change. That is to say, when viewed in cross section, the fibrillating element of FIGURE 4 need not always present a circular aspect. It can present an ovoid or other shape to produce what might be termed a periodic tugging effect or changing of tension regularity in the web as it is drawn passed the fibrillating element in frictional engagement therewith. The shape, when it is changed, of the fibrillating element or elements, can be correlated with the movement of the axis upon which it is mounted and/or of the guide rolls or slides. The guides of FIGURE 1 can be tension or spring biased and their precise location with respect to distance from a fibrillating element and from the axis thereof regulated or adjusted either before or during the operation.

An apparatus similar to that shown in FIGURE 1 has 3 discs 12-inches in diameter with 2-inch wide semicircular rims with $\frac{1}{16}$ inch sinusoidal humps on the rim. These rims are made of tool steel. The discs are placed 1 foot apart with the guide rings midway between and about 6 inches out from each end disc. Four-inch wide polypropylene film ½ mil. thick which has been previously oriented by drawing at a temperature of about 300° F. at a draw ratio of 12/1 is threaded through the guide rings and spacing bars so that the film will make 6 passes at the three disc arrangement. The puller rolls are set to pull the film through at 225 ft./min. The disc speeds are set at 1250 r.p.m. with the outer disc rotating in the opposite direction from the two end discs.

The product resulting from this run is a highly fibrillated continuous web with many fissures and few broken ends.

Reasonable variation and modification are possible within the scope of the foregoing disclosure, the drawing and the appended claims to the invention, the essence of which is that there have been provided a method for fibrillating and twisting a sheet material by collecting the same or compacting it into a continuous web which is guided across and kept in frictional engagement with a fibrillating element, the position of the web with respect to the fibrillating element being changed at will as described and that an apparatus wherewith to carry out the method of the invention has been described in several of its possible manifold embodiments, the apparatus comprising in combination the supply means, collecting means, guiding means, fibrillating means direction reversal means, etc., as described.

I claim:

1. A method for fibrillating a sheet material such as an oriented thermoplastic or polyolefin which comprises passing said material in frictional engagement across the edge of a rotating fibrillating means in a manner as follows:
   (a) collecting said sheet material to form a continuously moving compacted web;
   (b) continuously passing said web through a guiding and positioning means;
   (c) passing said positioned and continuously moving web across said fibrillating means in said frictional engagement so that said web is subjected to forces acting on it at a substantial angle to the direction of its motion whereby said web is fibrillated and twisted.

2. A method according to claim 1 wherein said web is passed through said guiding and positioning means ahead of said fibrillating means so that the web is formed and passes through said guiding and positioning means on its way to said fibrillating means and then the now at-least-to-an-extent fibrillated and twisted web is passed through a further guiding and positioning means beyond said fibrillating means.

3. A method according to claim 2 wherein said web is further positioned and guided as before ahead of and after passing across a further rotating fibrillating means in frictional engagement therewith which is rotating counter to the direction of rotation of the first mentioned rotating means.

4. A method according to claim 3 wherein the further fibrillated and now reverse twisted web is passed back across said further fibrillating means in frictional engagement therewith positioned and guided in a manner similar to that in which it was earlier handled, but in a direction opposite to that in which it was first passed across said fibrillating means.

5. A method according to claim 4 wherein the web is now passed in frictional engagement, guided and positioned in a manner similar to that in which it was earlier handled, back across said first mentioned fibrillating means.

6. A method according to claim 5 wherein the sheet material is a thermoplastic such as a polyolefin which has been oriented in at least the direction in which it travels across said fibrillating means.

7. An apparatus for fibrillating and twisting into a fibrous mass a sheet of material such as a polyolefin according to claim 1 which comprises in combination
   (a) at least one rotating fibrillating means adapted to its periphery to frictionally engage a mass or web of compacted sheet material passing thereacross;
   (b) driving means to rotate said fibrillating means;
   (c) supply means to supply said sheet material continuously;
   (d) means adjacent said fibrillating means to gather together said sheet material to form said compacted mass or web and to guide it across said fibrillating means in frictional engagement therewith;
   (e) means to draw said sheet material from said supply means across said fibrillating means through said guiding and positioning means; and
   (f) means to recover a mass of fibrillated and twisted material.

8. An apparatus according to claim 7 wherein a means to gather together said sheet material is disposed between said supply means and the said fibrillating means, and there is disposed adjacent said initial fibrillating means a guiding means to assist the passing of the web or mass across said fibrillating means in frictional engagement therewith.

9. An apparatus according to claim 8 wherein there is provided beyond said fibrillating means a web-direction-reversing means; there is also provided a means to guide the web again across said fibrillating means, and said recovery means and said supply means are disposed at the same side of said fibrillating means.

10. An apparatus according to claim 9 wherein there are at least three fibrillating means, two of which rotate in the same direction and encompassed between them a third fibrillating means rotating in opposite direction to that of said two fibrillating means and wherein a direction-reversing means is disposed beyond the last of said fibrillating means in the direction of travel from the supply means.

11. A method according to claim 1 wherein the compacted web is moved at an angle to its direction of travel while it is in frictional engagement with said rotating fibrillating means.

12. An apparatus according to claim 7 wherein guiding means, when said means guide said mass or web into frictional engagement with said fibrillating means, move said mass or web at an angle to the direction of travel of said mass or web while the same is in contact with said rotating fibrillating means.

References Cited

UNITED STATES PATENTS

| | | |
|---|---|---|
| 2,185,789 | 1/1940 | Jacqué. |
| 2,545,869 | 3/1951 | Bailey. |
| 2,700,657 | 1/1955 | Look et al. |
| 2,707,805 | 5/1955 | Smith et al. |
| 2,930,535 | 3/1960 | Jones et al. |
| 3,165,563 | 1/1965 | Rasmussen. |
| 3,177,557 | 4/1965 | White _____ 57—34 XR |
| 3,199,284 | 8/1965 | Scragg _____ 57—157 |
| 3,202,501 | 2/1967 | Greene. |

FRANK J. COHEN, *Primary Examiner.*

D. E. WATKINS, *Assistant Examiner.*